US008625785B2

(12) United States Patent  
Nagaraja

(10) Patent No.: US 8,625,785 B2
(45) Date of Patent: Jan. 7, 2014

(54) IDENTITY BASED SYMMETRIC CRYPTOSYSTEM USING SECURE BIOMETRIC MODEL

(75) Inventor: Nagendra Nagaraja, Bangalore Karnatak (IN)

(73) Assignee: QUALCOMM Incorporated, San Diego, CA (US)

( * ) Notice: Subject to any disclaimer, the term of this patent is extended or adjusted under 35 U.S.C. 154(b) by 1141 days.

(21) Appl. No.: 12/121,556

(22) Filed: May 15, 2008

(65) Prior Publication Data

US 2009/0287930 A1    Nov. 19, 2009

(51) Int. Cl.
*H04L 9/00*    (2006.01)
*H04L 9/08*    (2006.01)

(52) U.S. Cl.
CPC ........................................ *H04L 9/08* (2013.01)
USPC ............................................................ 380/44

(58) Field of Classification Search
USPC ............................................ 380/44; 713/186
See application file for complete search history.

(56) References Cited

U.S. PATENT DOCUMENTS

| | | | | |
|---|---|---|---|---|
| 6,079,018 A | * | 6/2000 | Hardy et al. ................... | 713/170 |
| 7,620,818 B2 | | 11/2009 | Vetro et al. | |
| 2004/0008846 A1 | * | 1/2004 | Medvinsky ................... | 380/278 |
| 2004/0019570 A1 | * | 1/2004 | Bolle et al. ...................... | 705/64 |
| 2006/0123239 A1 | * | 6/2006 | Martinian et al. ............ | 713/186 |
| 2007/0014400 A1 | * | 1/2007 | Wack et al. ..................... | 380/44 |
| 2007/0014406 A1 | | 1/2007 | Scheidt et al. | |
| 2007/0174633 A1 | * | 7/2007 | Draper et al. ................. | 713/186 |
| 2007/0198856 A1 | * | 8/2007 | Lee et al. ...................... | 713/190 |
| 2007/0239994 A1 | * | 10/2007 | Kulkarni et al. .............. | 713/189 |

FOREIGN PATENT DOCUMENTS

| | | |
|---|---|---|
| JP | 2000358025 A | 12/2000 |
| JP | 2005293490 A | 10/2005 |
| JP | 2006158851 A | 6/2006 |
| JP | 2006166433 A | 6/2006 |
| JP | 2006524352 A | 10/2006 |
| JP | 2008526080 A | 7/2008 |
| JP | 2008181085 A | 8/2008 |
| JP | 2009507267 A | 2/2009 |
| JP | 2009111971 A | 5/2009 |
| WO | WO2006115491 | 11/2006 |

OTHER PUBLICATIONS

International Search Report and the Written Opinion—PCT/US2009/044238, International Search Authority—European Patent Office—Nov. 9, 2009.

* cited by examiner

*Primary Examiner* — Peter Shaw
(74) *Attorney, Agent, or Firm* — Won Tae Kim

(57) ABSTRACT

Methods, apparatus, and computer program products are herein described that provide for an identity-based cryptosystem using a highly secure biometric model through which both access and data transmission are effectively made very secure. Through implementation of generating and securely storing biometric data as syndrome vectors tolerance is provided for the inherent variability of biometric data. In addition, to insure that the biometric data is not duplicated by adversaries who might gain access to the syndrome generation algorithm and the biometric data, present aspects, provide for keeping the private key more secure and making the cryptosystem user-identity dependent. As such the systems, apparatus and computer program products herein disclosed provide end-to-end authentication of end users using secure biometry, which constitute the symmetric and/or asymmetric identity-based cryptosystem.

22 Claims, 10 Drawing Sheets

IDENTITY BASED SYMMETRIC CRYPTOSYSTEM USING SECURE BIOMETRIC MODEL

BACKGROUND

1. Field

The present aspects relate to cryptographic systems, and more particularly, to systems, apparatus and methods for an identity based symmetric cryptosystem using biometric data that provides for both secure data transmission and secure access to transmit.

2. Background

Conventional password based security systems generally include two phases. First, an initial enrollment phase during which users select passwords, which are subsequently stored on an authentication device, such as an authentication server. Secondly, an authentication phase allows the user to gain access to resources or data by entering their passwords, which are then verified against the stored version of the password. However, such a password-based security mechanism is highly vulnerable. For example, if the passwords are stored as unencrypted, plain text, then an adversary who gains access to the system can obtain every password in the system. In this instance, even a single successful attack by the adversary can compromise the entire system. Additionally, password-based computer security systems are susceptible to brute force attacks, in which all possibilities are searched to decipher the passwords, or a dictionary attack, in which only possibilities most likely to succeed (e.g., a list derived from words in a dictionary) are searched.

An additional problem related to password-based security systems is that passwords are not required to be user-specific, in that passwords can be shared amongst more than one individual/user, making it difficult for the system to know who has the password at any given point in time. Thus, authentication in such security systems is possession based and thus, possession of the password is sufficient to establish user authenticity. This means that passwords are unable to provide requisite non-repudiation.

To address some of these problems conventional password systems have evolved to implement encryption. For example, the passwords are encrypted during the enrollment phase using an encryption or hash function and during the authentication phase, when a user enters a candidate password, the function is applied to the candidate password and access is granted if the encrypted candidate password matches the encrypted password stored during the enrollment phase. Such encrypted passwords provide no benefit to an adversary unless the adversary possesses or has knowledge of the encryption or hash function. However, unless the encryption function is deemed to be strong, adversaries have shown a propensity to be able to hack or otherwise decipher encryption codes. So-called "strong" encryption codes, while they may prevent hacking, may be too expensive, complex and/or inefficient to implement in certain instances.

Recently, biometric data has been used as a means of providing user authentication. In a biometric security system physical biometric features of a user are measured to obtain biometric parameters, commonly referred to as observations. The biometric features may include, but are not limited to, fingerprints, eye-related features, such as iris recognition, other face recognition features, voice recognition features and the like. However, a conventional biometric security system, in which the biometric data is unencrypted, has the same vulnerability as a conventional password based system. Specifically, if the database stores unencrypted biometric templates in a central database or in the user device, then the parameters are subject to attack and misuse. Once the biometric parameters are illicitly located, the adversary may be able to modify the parameters to match the appearance or characteristic of the adversary to gain unauthorized access. In addition, the threat exists of having "fake" biometric data inputted in an artificial manner. Also, unlike password security, biometric data is not a secret and, as such, some biometric data, such as fingerprints, can be easily forged if the data is obtained.

Additionally, encryption of biometric data has proven to be a challenging task. Among other reasons, the manner by which the biometric features are measured and the variance in the biometric features from one measurement to another, termed "noise" provide obstacles to a cryptographic system implementing biometric data. For example, biometric parameters may be captured and entered during an enrollment phase, such that enrollment biometric parameters are encrypted using an appropriate encryption function. However, during the authentication phase, the biometric parameters obtained from the same user may differ from those taken at enrollment. For example, if the biometric data is related to facial feature recognition, the capturing equipment and lighting may differ and the features themselves may change over time. Thus, if the biometric data captured during authentication are passed through the same encryption function, the result may not match the enrollment data. In this regard, no acceptable methods for performing error correction or syndrome code decoding for the noise structure particular to biometrics exists. Most previous secure biometric systems use a memory-less noise model or other models that oversimplify the nature of the noise and do not reflect actual operational conditions. As such, the previous attempts at secure biometrics do not adequately represent the time varying dynamics of biometric features and the acquisition and measurement processes.

Recently, multimodal biometric fusion has been introduced which uses in combination more than one source of biometric data with error correction and some secret information, such as a password or PIN to generate a secret key. However, this type of security technique requires storage of a large quantity of data and it tends to be resource intensive to implement and, thus costlier to implement than other biometric techniques. Additionally, liveliness detection testing of biometric data has been implemented, in which a "live" human characteristic is captured, such as temperature, blood flow, heartbeat or the like. However, implementation of liveliness detection testing may not be feasible on resource constrained devices, such as handheld wireless devices or the like, which would require different types of sensors than are currently available on such devices.

Therefore, a need exists to develop a highly secure biometric model through which both access and transmission can effectively be made very secure. The desired model should address and overcome the inherent variability of biometric data, while providing for a model that prevents duplication of biometric data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects define methods, apparatus, and computer program products that provide for an identity-based cryptosystem using a very secure biometric model through which both access and data transmission are effectively made very secure. In one aspect herein described, syndrome vectors of biometric data are generated and securely stored to provide for tolerance of the inherent variability of biometric data. In addition, to insure that the biometric data is not duplicated by adversaries who might gain access to the syndrome generation algorithm and the biometric data, present aspects, provide for keeping the private key more secure and making the cryptosystem user-identity dependent. In certain aspects, added security is accomplished by generating a private key from conventional key generation techniques and generating a final key from input of the private key and biometric data as a one-way function. As such the systems, apparatus and computer program products herein disclosed provide end-to-end authentication of end users using secure biometry, which constitute the symmetric and/or asymmetric identity-based cryptosystem.

Present aspects provide for a one-time registration of all biometric data between two communication points, example between a first end user device and a second end user device. In certain aspects, the one-time registration may be performed during the initial communication between the end user devices. The registration may provide for maintaining a biometric address book, either locally or network-based, using syndrome coded and/or distorted/transformed data, otherwise referred to as cancellable biometric data, to prevent adversaries from acquiring the raw biometric data.

After the registration has been performed, biometric data may be randomly sampled and combined with a conventional private key using a one-way function to result in a final key that is used to encrypt data. The biometric data may be distorted/transformed biometric data and/or stored using syndrome code to provide additional security. Once the encrypted data is received by the device, which has registered the biometric data, the biometric data is retrieved according to a device identifier and based on a randomizer received from the encrypting device, the decrypting device determines which biometric should be used for decryption. The biometric data and the randomizer are then combined to form the final private key used for decrypting the data.

According to one aspect, a method for encrypting a data transmission using randomized biometric data is provided. The method includes receiving a biometric data sample associated with a user of a computing device and distorting the biometric data sample into a plurality of distorted biometric data. The distorted plurality of biometric data is then stored as a syndrome vector. The method further includes obtaining a random sample of the stored distorted biometric data and generating an encryption key using a combination of a private key associated with the device and the random sample of the distorted biometric data. The encryption key may be generated using a one-way function. The method additionally includes encrypting a data transmission using the encryption key. The method may further include communicating the stored distorted biometric data and the private key to a second computing device upon establishing a first communication with the second computing device.

In alternate aspects of the method, distorting the biometric data sample may further include randomly distorting the biometric data sample into the plurality of distorted biometric data and, in one aspect the random distortion may be synchronized with the random sampling of the stored distorted biometric data, such that both processes implement the same randomizer. Additionally, in some aspects, distorting the biometric data sample may further include dynamically distorting the biometric data sample into the plurality of distorted biometric data, such that the distorting operation changes over time or the changes based on preconfiguration.

Additional aspects of the method may provide for applying error correction to one or more of the plurality of distorted biometric data. In those aspects in which error correction is applied, the error correction may be applied randomly and the randomization may be synchronized with one or more of the distortion of the biometric data and obtaining the random sample of the distorted biometric data. Thus, in one aspect, distorting the biometric data, applying error correction and generating an encryption key are all performed in synchronized randomization.

A further aspect is defined by at least one processor configured to encrypt data transmissions using randomized biometric data. The processor includes a first module for receiving a biometric data sample associated with a user of a computing device and a second module for distorting the biometric data sample into a plurality of distorted biometric data. The processor additionally includes a third module for storing each of the plurality of distorted biometric data as a syndrome vector and a fourth module for obtaining a random sample of the stored distorted biometric data. Also, the processor includes a fifth module for generating an encryption key using a combination of a private key associated with the device and the random sample of the distorted biometric data and a sixth module for encrypting a data transmission using the encryption key.

Another related aspect is provided for by a computer program product that includes a computer-readable medium. The medium includes a first set of codes for causing a computer to receive a biometric data sample associated with a user of a computing device and a second set of codes for causing the computer to distort the biometric data sample into a plurality of distorted biometric data. The medium additionally includes a third set of codes for causing the computer to store each of the plurality of distorted biometric data as a syndrome vector and a fourth set of codes for causing the computer to obtain a random sample of the stored distorted biometric data. Also the medium includes a fifth set of codes for causing the computer to generate an encryption key using a combination of a private key associated with the device and the random sample of the distorted biometric data and a sixth set of codes for a causing the computer to encrypt a data transmission using the encryption key.

An apparatus provides for another related aspect. The apparatus includes means for receiving a biometric data sample associated with a user of a computing device and means for distorting the biometric data sample into a plurality of distorted biometric data. The apparatus additionally includes means for storing each of the plurality of distorted biometric data as a syndrome vector and means for obtaining a random sample of the stored distorted biometric data. Also, the apparatus includes means for generating an encryption key using a combination of a private key associated with the device and the random sample of the distorted biometric data and means for encrypting a data transmission using the encryption key.

Yet another related aspect is defined by an apparatus that includes a computing platform including a processor and a memory in communication with the processor. The apparatus additionally includes one or more biometric sensors in communication with the processor and a biometric data distorter in communication with the processor and the biometric sensors and operable to distort biometric data captured by the sensors into a plurality of distorted biometric data. The apparatus further includes a biometric sampler in communication with the processor, the memory and the biometric data distorter. The biometric sampler is operable to generate and store syndrome vectors for each of the plurality of distorted biometric data. The apparatus further includes an encryption key generator in communication with the processor and the biometric sampler operable to randomly obtain a sample of the stored distorted biometric data and generate an encryption key based on a private key and the sample of biometric data. The encryption key generator may be operable to generate the encryption key using a one-way function. The apparatus additionally includes a randomization module in communication with the processor and the encryption key generator, such that the randomization module is operable to obtain a random sample of the stored distorted biometric data. The apparatus also includes an encryption engine operable to encrypt data transmissions using the encryption key.

The apparatus may further include a communications module in communication with the processor and the biometric sampler, wherein the communications module is operable to communicate the distorted biometric data to a second computing device upon establishing a first-time communication with the second computing device. The communications module may be further operable to communicate the randomizer and the encrypted data to the second computing device.

In further aspects the randomization module may be in communication with the biometric data distorter and be operable to randomly distort the biometric data. As such the randomness applied to obtaining the sample of the stored distorted biometric data and the randomness applied to the distortion of the biometric data may be synchronized randomization. In other aspects, the biometric data distorter may be further operable to dynamically change the distortion of the biometric data over time based on pre-configuration or the like.

The apparatus may further include an error correction module operable for applying error correction to one or more of the plurality of distorted biometric data. In those aspects that include an error correction module, the randomization module may be in further communication with the error correction module to randomly apply error correction to one or more of the plurality of distorted biometric data. Thus, the randomization module may be further operable to provide a synchronized randomizer to the encryption key generator to randomly obtain the sample of stored distorted biometric data, to the error correction module to randomly apply error correction to one or more of the plurality of distorted biometric data and to the biometric data distorter to randomly distort the biometric data sample into the plurality of distorted biometric data.

A further aspect on the innovation is provided for by a method for symmetric identity based decryption based on biometric data. The method includes receiving biometric data and a private key from a first device and storing the biometric data and private key based on an association with the first device. In one aspect the biometric data will be stored in a biometric address book that associates the data with first device identifier, such as a telephone number, IP address or the like. The method further includes receiving first encrypted data and a corresponding first randomizer from the first device and obtaining a first random sample of the stored biometric data corresponding to the first device based on the first randomizer received from the first device. The method also includes generating a first decryption key using a combination of the private key corresponding to the first device and the first random sample of the biometric data and decrypting the first encrypted data using the first decryption key. The generation of the first decryption key may be accomplished using a one-way function.

In certain aspects of the method, the biometric data and the private key will be received based on a first time communication with the first device, such that the device checks the biometric address book and if any entry does not exist for the device identifier then the biometric data and the private key are requested or otherwise retrieved from the first device.

In certain aspects, the biometric data that is received from the first device may further be defined as distorted biometric data and, in some instances, randomly distorted biometric data, where the randomness of the distorted biometric data is based on the first randomizer.

In alternate aspects the method may further include receiving second encrypted data and a corresponding second randomizer from the first device, wherein the second randomizer differs from the first randomizer, obtaining a second random sample of the stored biometric data corresponding to the first device based on the second randomizer received from the first device, generating a second decryption key using a combination of the private key corresponding to the first device and the second random sample of the biometric data and decrypting the second encrypted data using the second decryption key.

A further related aspect is defined by at least one processor configured to provide symmetric identity based decryption based on biometric data. The processor includes a first module for receiving biometric data and a private key from a first device and a second module for storing the biometric data and private key based on an association with the first device. The processor additionally includes a third module for receiving first encrypted data and a corresponding first randomizer from the first device and a fourth module for obtaining a first random sample of the stored biometric data corresponding to the first device based on the first randomizer received from the first device. The processor also includes a fifth module for generating a first decryption key using a combination of the private key corresponding to the first device and the first random sample of the biometric data and a sixth module for decrypting the first encrypted data using the decryption key.

A computer program product provides for yet another related aspect. The computer program product includes a computer-readable medium. The medium includes a first set of codes for causing a computer to receive biometric data and a private key from a first device and a second set of codes for store the biometric data and private key based on an association with the first device. The medium additionally includes a third set of codes for causing the computer to receive first encrypted data and a corresponding first randomizer from the first device and a fourth set of codes for causing the computer to obtain a first random sample of the stored biometric data corresponding to the first device based on the first randomizer received from the first device. The medium additionally includes a fifth set of codes for causing the computer to generate a first decryption key using a combination of the private key corresponding to the first device and the first random sample of the biometric data and a sixth set of codes for a causing the computer to decrypt the first encrypted data using the decryption key.

Another related aspect is defined by an apparatus. The apparatus includes means for receiving biometric data and a private key from a first device and means for storing the biometric data and private key based on an association with the first device. The apparatus additionally includes means for receiving first encrypted data and a corresponding first randomizer from the first device and means for obtaining a first random sample of the stored biometric data corresponding to the first device based on the first randomizer received from the first device. The apparatus also includes means for generating a first decryption key using a combination of the private key corresponding to the first device and the first random sample of the biometric data and means for decrypting the first encrypted data using the decryption key.

An apparatus defines yet another related aspect of the present innovation. The apparatus includes a computing platform including a processor and a memory in communication with the processor. The apparatus also includes a communications module in communication with the processor and operable to receive biometric data and a private key from a first device and a biometric address book stored in the memory and operable to store the biometric data and the private key based on an association with the first device. The apparatus additionally includes a decryption key generator in communication with the processor and operable to generate a decryption key based on receipt by the communication module of encrypted data and a corresponding randomizer, wherein the decryption key generator is further operable to obtain a random sample of the stored biometric data based on the randomizer and generate the decryption key using a combination of the private key and the random sample of the biometric data. The apparatus also includes a decryption engine in communication with the processor and operable to decrypt the encrypted data using the decryption key. The decryption key generator may be further operable to generate the decryption key using a one-way function In certain aspects of the apparatus, the communications module is further operable to receive the biometric data and the private key based on a first time communication with the first device. Additionally, in optional aspects, the communications module is further operable to receive distorted biometric data from the first device and, in some aspects, randomly distorted biometric.

Thus, present aspects define methods, apparatus, and computer program products that provide for an identity-based cryptosystem using a highly secure biometric model through which both access and data transmission are effectively made very secure. Through implementation of generating and securely storing biometric data as syndrome vectors, tolerance is provided for the inherent variability of biometric data. In addition, to insure that the biometric data is not duplicated by adversaries who might gain access to the syndrome generation algorithm and the biometric data, present aspects, provide for keeping the private key more secure and making the cryptosystem user-identity dependent. As such the systems, apparatus and computer program products herein disclosed provide end-to-end authentication of end users using secure biometry, which constitute the symmetric and/or asymmetric identity-based cryptosystem.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
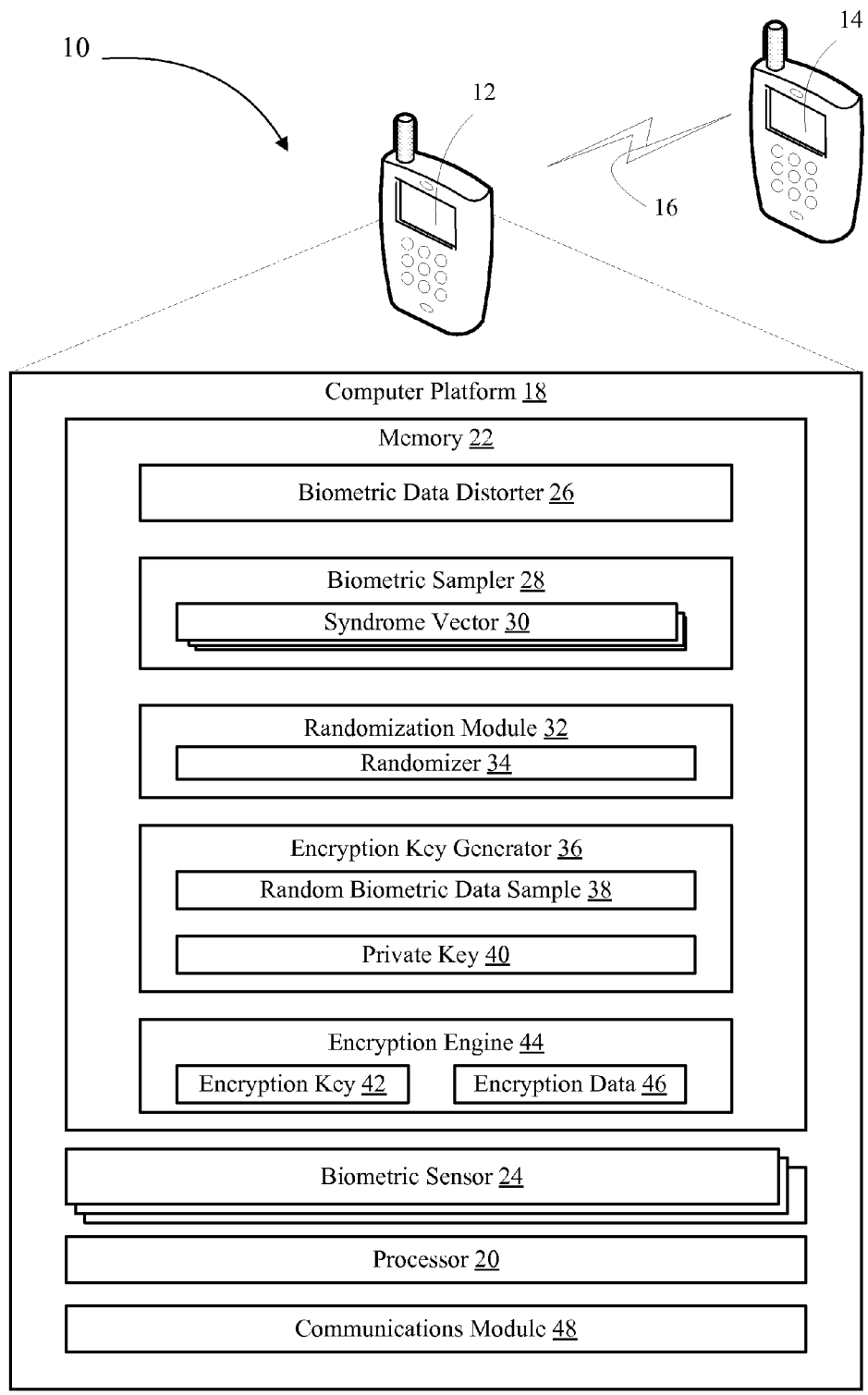
FIG. 1 is a block diagram of a system for identity-based cryptology using a secure biometric model, highlighting the encryption process, according to an aspect of the present innovation.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Present aspects herein describe methods, apparatus and computer program products for an identity-based cryptosystem using a highly secure biometric model that results in heightened security for both access and data transmission. Present aspects rely on storing biometric data in syndrome vector format to provide tolerance in the inherent variability associated with biometric data. However, use of syndrome vectors alone does not address the problems associated with duplicating biometric data, thereby breaking the security provided by biometric data. Present aspects address this concern by making the private key more secure and also making the cryptosystem user-identity dependent. To accomplish this, in present aspects the private key is generated from conventional key generation techniques and the final encryption/decryption keys are generated from an input of the private key and the biometric data using a one-way function. Thus, methods, apparatus and computer-programs herein described provide for an end-to-end authentication of end users using secure biometric data, which constitutes the symmetric identity-based cryptosystem.

Figure 2:
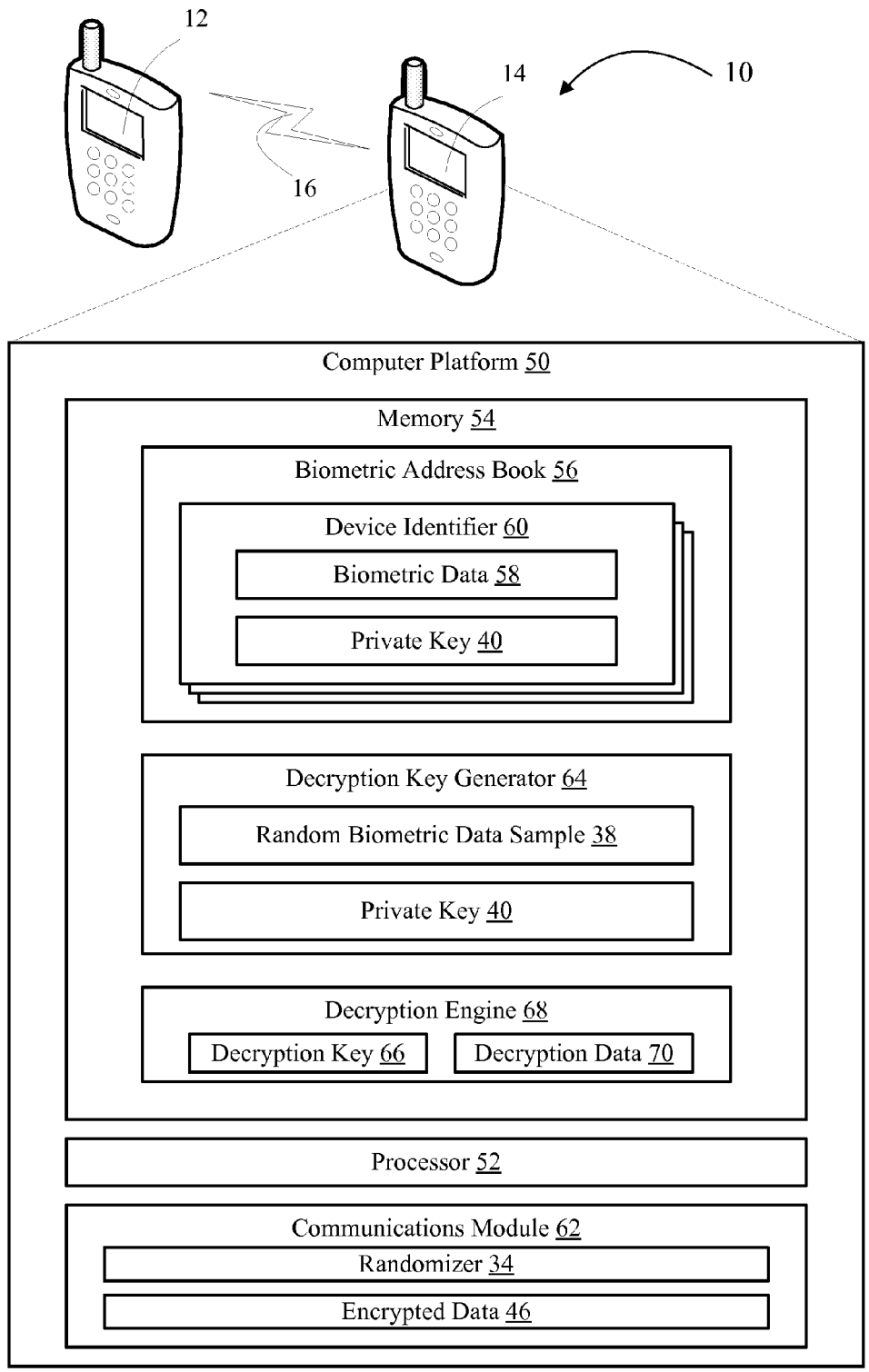
FIG. 2 is a block diagram of the system for identity-based cryptology using a secure biometric model, highlighting the decryption process, according to an aspect of the present innovation.
Figure 3:
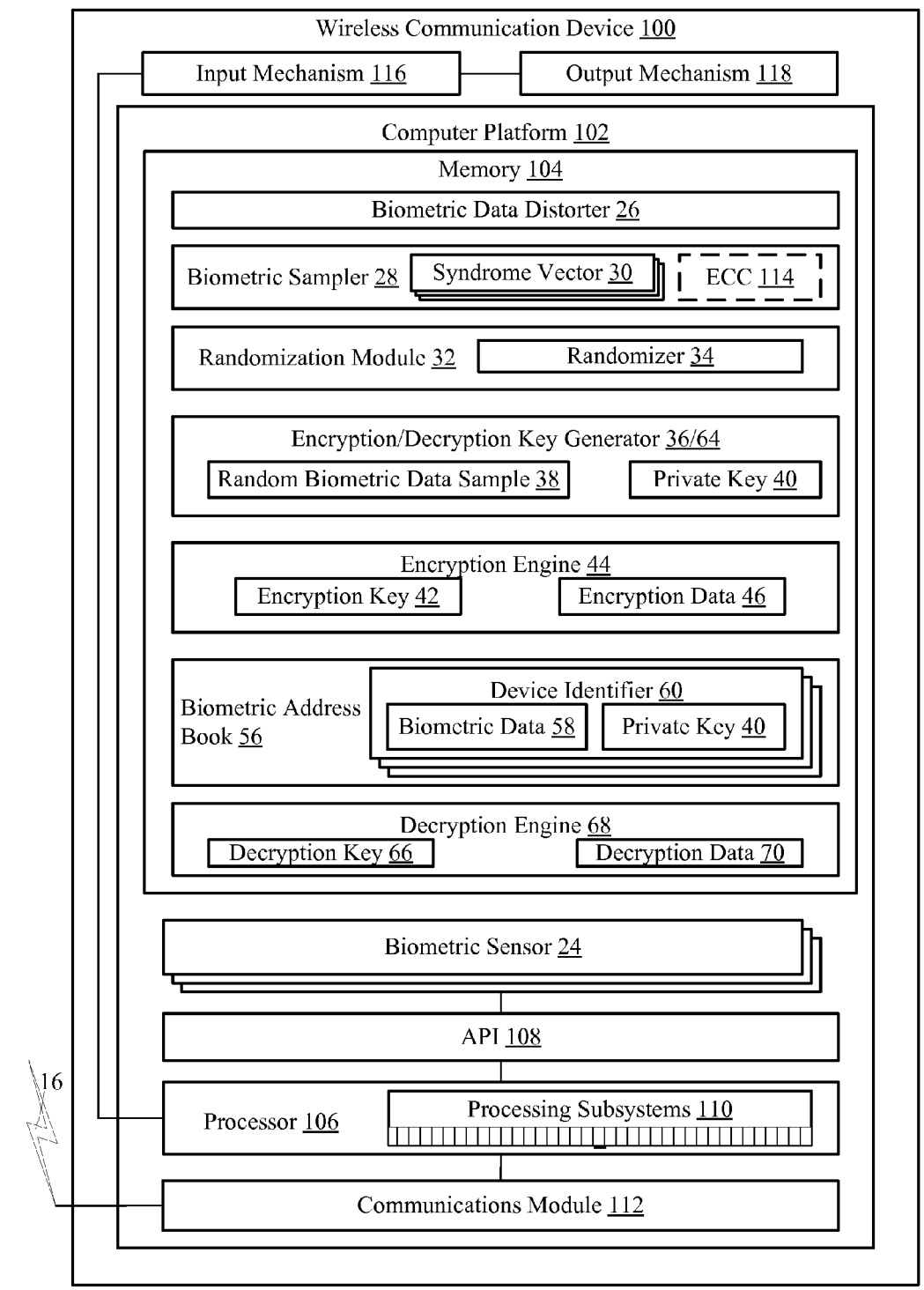
FIG. 3 is a detailed block diagram of a computing device implementing identity-based cryptology using a secure biometric model, according to another aspect of the present innovation.

FIGS. 1 and 2 provide high-level block diagrams of an identity-based cryptosystem 10. The system 10 includes a first computing device 12 and a second computing device 14 that communicate across a computing network 16. While the system 10 shown in FIGS. 1 and 2 includes a first computing device 12 for encrypting data that is a wireless communication device and a second computing device 14 for decrypting data that is wireless communication device and, thus the devices communicate across a computing network 16 that is a wireless communication network, the cryptosystem herein disclosed may be utilized on any computing device, wireless or wired, that transmits data across a computing network. Additionally, while FIGS. 1 and 2 depict encryption in terms of first wireless communication device 12 and decryption in terms of second wireless communication device 14, in most instances each wireless communication device may be configured with the necessary hardware and software to perform both encryption and decryption per the disclosed aspects as shown in FIG. 3.

Referring to FIG. 1, first computing device 12, operable to provide identity-based encryption, includes a computing platform 18 that includes a processor 20 and a memory 22 in communication with the processor 20. The computing platform 18 includes one or more biometric sensors 24 that are operable to sense and capture biometric data related to the user of the computing device 12. Biometric sensors may include, but are not limited to, fingerprint sensors, voice sensors, facial feature sensors, eye/iris sensors, and any other sensor that detects and captures a biometric feature of the user. While the biometric sensors 24 herein depicted are standalone sensors, the sensors may also be embodied as processing subsystems of processor 20 or may be embodied as software modules located in memory 22.

The memory 22 of computing platform 18 includes a biometric data distorter 26 operable to receive biometric data from the biometric sensors 24 and distort the data into a plurality of distorted biometric data, otherwise referred to in the art as cancellable biometric data. The biometric data distorter 26 may be any device that distorts, manipulates, filters or otherwise changes the biometric data. In addition, the biometric data distorter 26 may apply distortion to the entire received biometric data or any portion thereof. The biometric data distorter 26 may also be configured to distort biometric data coming from more than one type of biometric sensor 24, such that the resulting distorted biometric data is a combination of biometric data received from two or more biometric sensors 26. It should be noted that while the biometric data distorter 26 is shown as being located within memory 22 and, thus, embodied within software, biometric data distorter 26 may also be implemented in hardware and, thus, be located external from memory 22. By distorting the biometric data, an added level of security is provided in protecting that data from being duplicated by an adversary.

Additionally, memory 22 of computing platform 18 includes a biometric sampler 28 operable for generating and storing syndrome vectors 30 for each of the plurality of distorted biometric data. Syndrome vectors, which will be discussed at length infra., provide for tolerance in the inherent variability of biometric data. In present aspects, distorted biometric data is stored in the form of syndrome vectors 30 thereby not only correcting the variability of biometric data but also providing heightened security through the use of secure distorted (i.e., cancellable) biometric data.

Memory 22 of computing platform 18 additionally includes a randomization module 32 operable to provide a randomizer 34, such as a random number or any other form of randomness, to one or more functions in the encryption process. In one aspect, randomization module 32 is operable for providing the randomizer 34 to the random selection of the distorted biometric data used to generate an encryption key. Thus, randomization module 32 may in communication with encryption key generator 36 that is operable to generate an encryption key 42 based on a random sample of the distorted biometric data 38 and a private key 40. The random sample of the distorted biometric data 38 may be obtained by applying the randomizer 34 to the distorted biometric data stored in the form of syndrome vectors 30, such that the random sample of biometric data 38 used to generate the encryption key 42 may be a random sample of the syndrome vectors. The private key 40 may be generated by any conventional technique for generating a private key. The encryption key may be generated using a one-way function, such as a log based function, for example, Elgamal, Elliptic Curve Menezes-Qu-Vanstone (ECMQV), Elliptic Curve Diffie-Hellman (ECDH) or the like.

The memory 22 of computing platform 18 additionally includes an encryption engine 44 in communication with processor 20 and operable to apply the encryption key 42 to encrypt data 46.

The first computing device 12 additionally includes a communication module 48 that is in communication with processor 20. The communications module is operable to communicate the biometric data and the private key to another computing device, such as second computing device 14. In most instances, the communications module may be configured to communicate the biometric data and the private key 40 to another computing device based on a first-time/initial communication with the other computing device. In addition, the communications module is operable for communicating encrypted data 46 and randomizer 34 to the other computing device for subsequent decryption by the other computing device.

Referring to FIG. 2, second computing device 14, operable to provide identity-based decryption, includes a computing platform 50 that includes a processor 52 and a memory 54 in communication with the processor 52. The memory 54 of computing platform 50 includes a biometric address book 56 operable to store biometric data 58 and a private key 40 received from another computing device, such as first computing device 12. The biometric data 58 and private key 40 are associated with the device from which the data and key were received in the biometric address book 56 according to a device identifier 60. The device identifier 60 may be a telephone number, an IP address or the like. In some aspects, the biometric data 58 stored in the address book 56 may be distorted biometric data and, further the distorted biometric data may be in the form of syndrome vectors 30. Entries in the biometric address book 56 may be created based on an initial, first time communication with another computing device. The other computing device may automatically send the biometric data 58 and the private 40 based on an initial communication with the second computing device 14 or the second computing device may request the biometric data and private key after verifying that an entry does not currently exist in the biometric address book 56 for the other computing device. While in most aspects the biometric address book 56 will reside in the memory 54 of second computing device 14, it is also possible, and within the innovative concepts herein disclosed, for the address book 56 to reside at network storage site (not shown in FIG. 2) and to be remotely accessible to the second computing device 14.

The second computing device 14 additionally includes a communication module 62 in communication with processor 52 operable to receive encrypted data 46 and randomizer 34 from first computing device 12. Based on receipt of the encrypted data 46 and the randomizer 34, the decryption key generator 64 is invoked to generate the appropriate decryption key 66 for the encrypted data 46.

The decryption key generator 64 is stored in the memory 54 and in communication with the processor 52. The decryption key generator 64 is operable to obtain a random sample 38 of the biometric data 58 stored in the biometric address book 56 based on the randomizer 34 and generate the decryption key 66 using a combination of the private key 40 and the biometric data random sample 38. As noted, the same randomizer 34 is used to select the random sample of biometric data at the decryption key generator as is used to select the same random sample of biometric data at the encryption key generator (36 of FIG. 1) of first computing device 12.

The second computing device additionally includes a decryption engine 68 stored in the memory 54 and in communication with the processor 52. The decryption engine 68 is operable to decrypt the encrypted data 46 using the decryption key 66 to result in decrypted data 70.

Referring to FIG. 3, according to one aspect, depicted is a detailed block diagram representation of a computing device, specifically a wireless communication device 100 configured to embody both facets of the identity-based cryptosystem described in FIGS. 1 and 2. The wireless communication device 100 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 100 includes computer platform 102 that can transmit data across a wireless network, and that can receive and execute routines and applications. Computer platform 102 includes memory 104, which may comprise volatile and nonvolatile memory such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk.

Further, computer platform 102 also includes processor 106, which may be an application-specific integrated circuit ("ASIC"), or other chipset, processor, logic circuit, or other data processing device. Processor 106 or other processor such as ASIC may execute an application programming interface ("API") layer 108 that interfaces with any resident programs, such as biometric data distorter 26, biometric sampler 28, randomization module 32, encryption key generator 36, encryption engine 44, decryption key generator 64 or decryption engine 68 stored in the memory 104 of the wireless device 100. API 108 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 106 includes various processing subsystems 110 embodied in hardware, firmware, software, and combinations thereof, that enable the functionality of communication device 100 and the operability of the communication device on a wireless network. For example, processing subsystems 110 allow for initiating and maintaining communications, and exchanging data, with other networked devices. In aspects in which the communication device is defined as a cellular telephone the communications processor 106 may additionally include one or a combination of processing subsystems 110, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 3 for the sake of clarity). For the disclosed aspects, processing subsystems 110 of processor 106 may include any biometric sensors 24 or any module stored in memory 104, for example, biometric data distorter 26, biometric sampler 28, randomization module 32, encryption key generator 36, encryption engine 44, decryption key generator 64 or decryption engine 68

Computer platform 102 additionally includes communications module 112 embodied in hardware, firmware, software, and combinations thereof, that enables communications among the various components of the wireless communication device 100, as well as between the wireless device 100 and wireless network 16. In described aspects, the communication module 112 enables the communication of all correspondence between wireless communication device 100 and other wired or wireless devices. Thus, communication module 112 may include the requisite hardware, firmware, software and/or combinations thereof for establishing a wireless network communication connection. In some aspects, the communication module is operable for sending biometric data 58 and private key 40 to a another computing device for inclusion in the other computing device's biometric address book, receiving biometric data 58 and a private key 40 from another computing device for inclusion in the resident biometric address book 56, and sending or receiving encrypted data 46 and the associated randomizer 34.

The computing platform 102 includes one or biometric sensors 24 that are operable to sense and capture biometric data related to the user of the wireless communication device 100. Biometric sensors may include, but are not limited to, fingerprint sensors, voice sensors, facial feature sensors, eye/iris sensors, and any other sensor that detects and captures a biometric feature of the user. While the biometric sensors 24 herein depicted are standalone sensors, the sensors may also be embodied as processing subsystems 110 of processor 106 or may be embodied as software modules located in memory 104.

The memory 104 of computing platform 102 includes a biometric data distorter 26 operable to receive biometric data from the biometric sensors 24 and distort the data into a plurality of distorted biometric data, otherwise referred to in the art as cancellable biometric data. The biometric data distorter 26 may be any algorithm that distorts, manipulates, filters or otherwise changes the biometric data. In addition, the biometric data distorter 26 may apply distortion to the entire received biometric data or any portion therefore. The biometric data distorter 26 may also be configured to distort biometric data coming from more than one type of biometric sensor 24, such that the resulting distorted biometric data is a combination of biometric data received from two or more biometric sensors 26. It should be noted that while the biometric data distorter 26 is shown as being located within memory 104 and, thus, embodied within software, biometric data distorter 26 may also be implemented in hardware and, thus, be located external from memory 104.

Additionally, memory 104 of computing platform 102 includes a biometric sampler 28 operable for generating and storing syndrome vectors 30 for each of the plurality of distorted biometric data. In present aspects, distorted biometric data is stored in the form of syndrome vectors 30 thereby not only correcting the variability of biometric data but also providing heightened security through the use secure distorted (i.e., cancellable) biometric data. The biometric sampler 28 may additionally include an optional error correction code module 114, which is operable to apply error correction to the distorted biometric data. In those aspects in which the biometric sampler 28 implements error correction code processing, the error correction code application may be random. Thus, error correction code module 114 may be in communication with a randomization module 32 operable to provide a randomizer 34, such as a random number or any other form of randomness, to the error correction code module 114.

In one aspect, randomization module 32 is operable for providing the randomizer 34 to the random selection of the distorted biometric data used to generate an encryption key. Thus, randomization module 32 may be in communication with encryption key generator 36 that is operable to generate an encryption key 42 based a random sample of the distorted biometric data 38 and a private key 40. The random sample of the distorted biometric data 38 may be obtained by applying the randomizer 34 to the distorted biometric data stored in the form of syndrome vectors 30, such that the random sample of biometric data 38 used to generate the encryption key 42 may be a random sample of the syndrome vectors. The private key 40 may be generated by any conventional technique for generating a private key. The encryption key may be generated using a one-way function, such as a log based function, for example, Elgamal, Elliptic Curve Menezes-Qu-Vanstone (ECMQV), Elliptic Curve Diffie-Hellman (ECDH) or the like. The memory 104 of computing platform 102 additionally includes an encryption engine 44 in communication with processor 20 and operable to apply the encryption key 42 to encrypt data 46.

From the decryption perspective, the memory 104 of computing platform 102 may include a biometric address book 56 operable to store biometric data 58 and a private key 40 based on an association with the device from which the biometric data and key were received. The association may be based on device identifier 60, which may be a telephone number, an IP address or the like. In some aspects, the biometric data 58 stored in the address book 56 may be distorted biometric data and, further the distorted biometric data may be in the form of syndrome vectors 30. Entries in the biometric address book 56 may be created based on an initial, first time communication with another computing device.

The memory 104 additionally a decryption key generator 64 operable to obtain a random sample 38 of the biometric data 58 stored in the biometric address book 56 based on the randomizer 34 and generate the decryption key 66 using a combination of the private key 40 and the biometric data random sample 38. The memory 104 also includes a decryption engine 68 operable to decrypt the encrypted data 46 using the decryption key 66 to result in decrypted data 70.

Additionally, wireless communication device 100 has input mechanism 116 for generating inputs into communication device, and output mechanism 118 for generating information for consumption by the user of the communication device. For example, input mechanism 116 may include a mechanism such as a key or keyboard, a mouse, a touchscreen display, a microphone, etc. Further, for example, output mechanism 118 may include a display, an audio speaker, a haptic feedback mechanism, etc.

Figure 4:
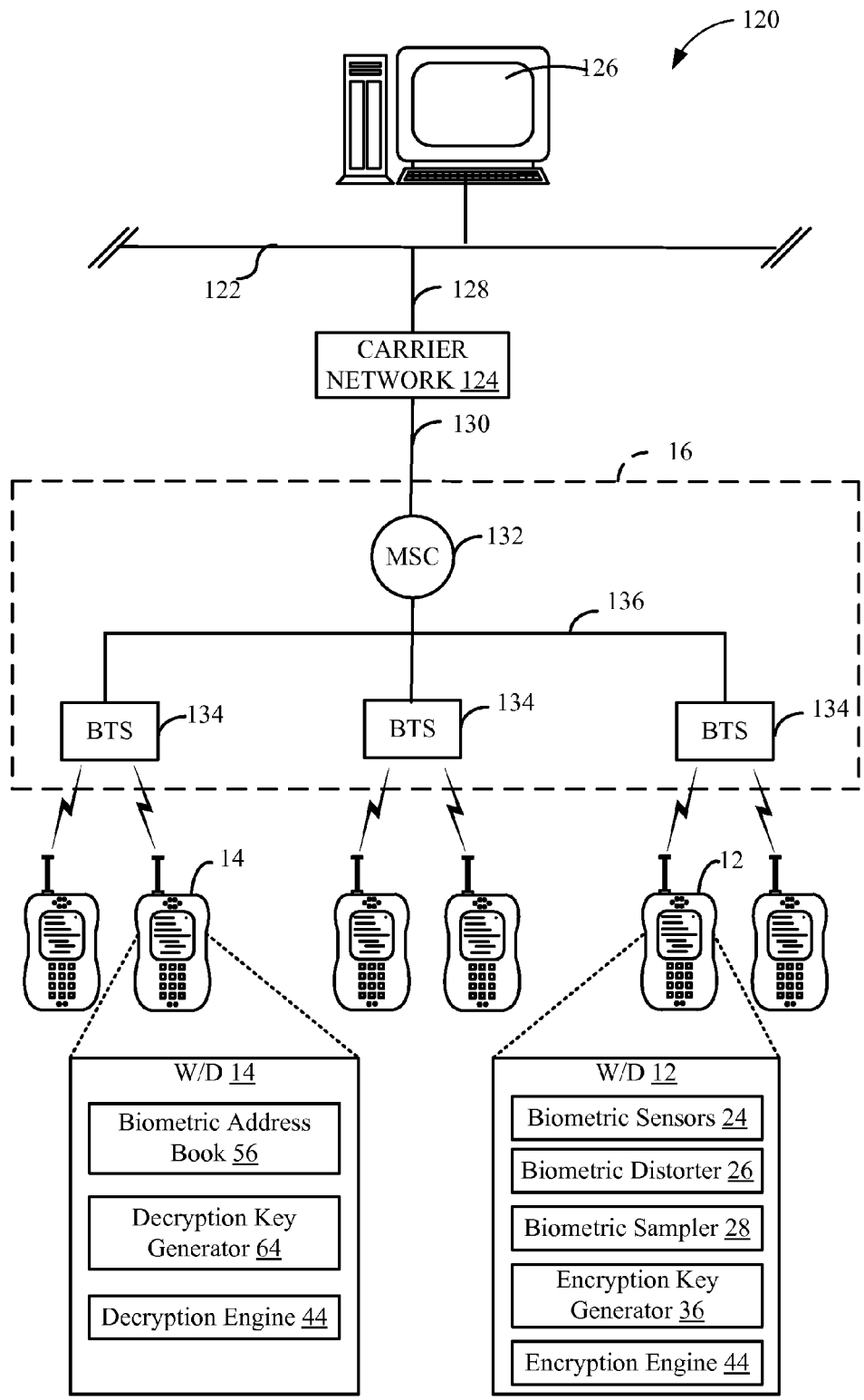
FIG. 4 is a block diagram of a cellular network used to communicate biometric data and encrypted data according to the identity-based cryptosystem of the present innovation.

FIG. 4 represents a block diagram of a cellular network 120, which may be used in conjunction with present aspects to communicate biometric data, encryption keys and encrypted data. A wireless network 16 may be included within cellular network 120 and, as such may be implemented to communicate the biometric data, encryption keys and encrypted data between wireless devices and/or between a wireless device and a wired computing device. Referring to FIG. 4, in one aspect, first and second computing device 12 and 14 comprise wireless communication devices, such as a cellular telephone. In present aspects, wireless communication devices are configured to communicate via the cellular network 120. The cellular network 120 provides wireless communication devices 12 and 14 the capability to communicate communication data packets, such as data packets including biometric data and/or encrypted data. The cellular telephone network 120 may include wireless network 16 connected to a wired network 122 via a carrier network 124. FIG. 4 is a representative diagram that more fully illustrates the components of a wireless communication network and the interrelation of the elements of one aspect of the present system. Cellular telephone network 120 is merely exemplary and can include any system whereby remote modules, such as wireless communication devices 12 and 14 communicate over-the-air between and among each other and/or between and among components of a wireless network 16, including, without limitation, wireless network carriers and/or servers.

In network 120, computing device 126, which may be configured to include biometric encryption/decryption, including a biometric address book, in accordance with present aspects, can be in communication over a wired network 122 (e.g. a local area network, LAN). Computing device 126 may receive and/or generate and communicate communication data packets, such as data packets that include biometric data and/or encrypted data to and from the wireless devices 12 and 14. Computing device 126 may be present on the cellular telephone network 120 with any other network components that are needed to provide cellular telecommunication services. Computing device 126 communicates with carrier network 124 through data links 128 and 130, which may be data links such as the Internet, a secure LAN, WAN, or other network. Carrier network 124 controls messages (generally being data packets) sent to a mobile switching center ("MSC") 132. Further, carrier network 124 communicates with MSC 132 by a network 130, such as the Internet, and/or POTS ("plain old telephone service"). Typically, in network 130, a network or Internet portion transfers data, and the POTS portion transfers voice information. MSC 132 may be connected to multiple base stations ("BTS") 134 by another network 136, such as a data network and/or Internet portion for data transfer and a POTS portion for voice information. BTS 134 ultimately broadcasts messages wirelessly to the wireless communication devices 12 and 14, by short messaging service ("SMS"), or other over-the-air methods.

Figure 5:
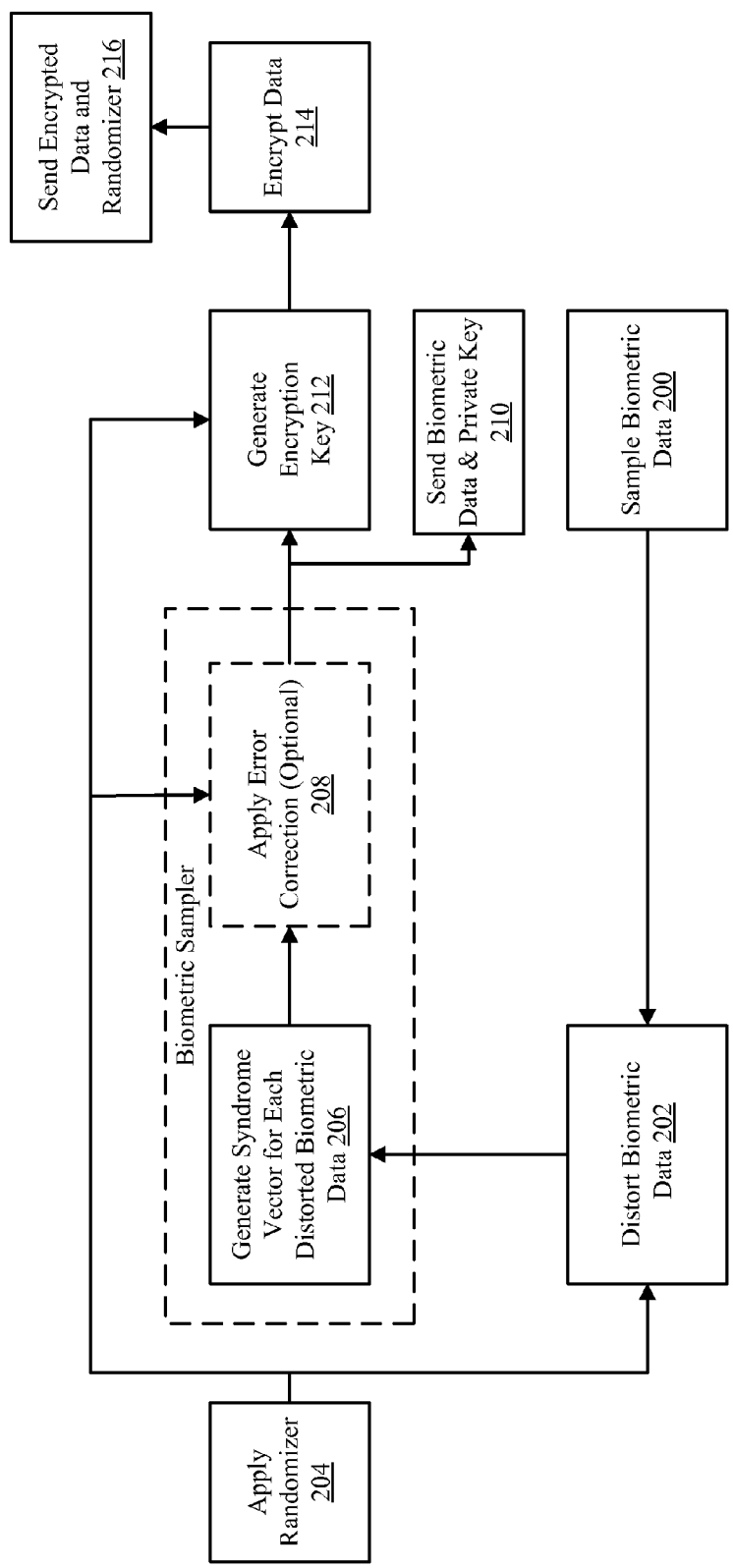
FIG. 5 is a flow diagram of a method for data encryption in an identity-based cryptosystem implementing a secure biometric model, according to an aspect of the innovation.

FIG. 5 is a flow diagram of a method for identity-based encryption using a secure biometric model, according to a present aspect. At Event 200, raw biometric data is sampled, captured, measured or otherwise acquired from a user of a computing device, which according to some aspects may be a wireless computing device. As previous noted the biometric data may include any biometric feature or characteristic associated with a user that can be characteristically sampled. Examples of biometric data include, but are not limited to, fingerprint data, voice data, facial feature data, such as eye or iris characteristics, and the like.

At Event 202, the raw biometric data is distorted, manipulated or otherwise changed to result in a plurality of distorted biometric data, otherwise referred to as cancellable biometric data. In some aspects, distorting of the biometric data may be random distortion of the biometric data. Thus, at Event 204, an optional randomizer, such as a random number or the like, may be applied to randomize the distortion process. Additionally, in some aspects, the distortion of the biometric data may dynamically change over time based on a pre-configuration of a distortion algorithm.

Figure 7:
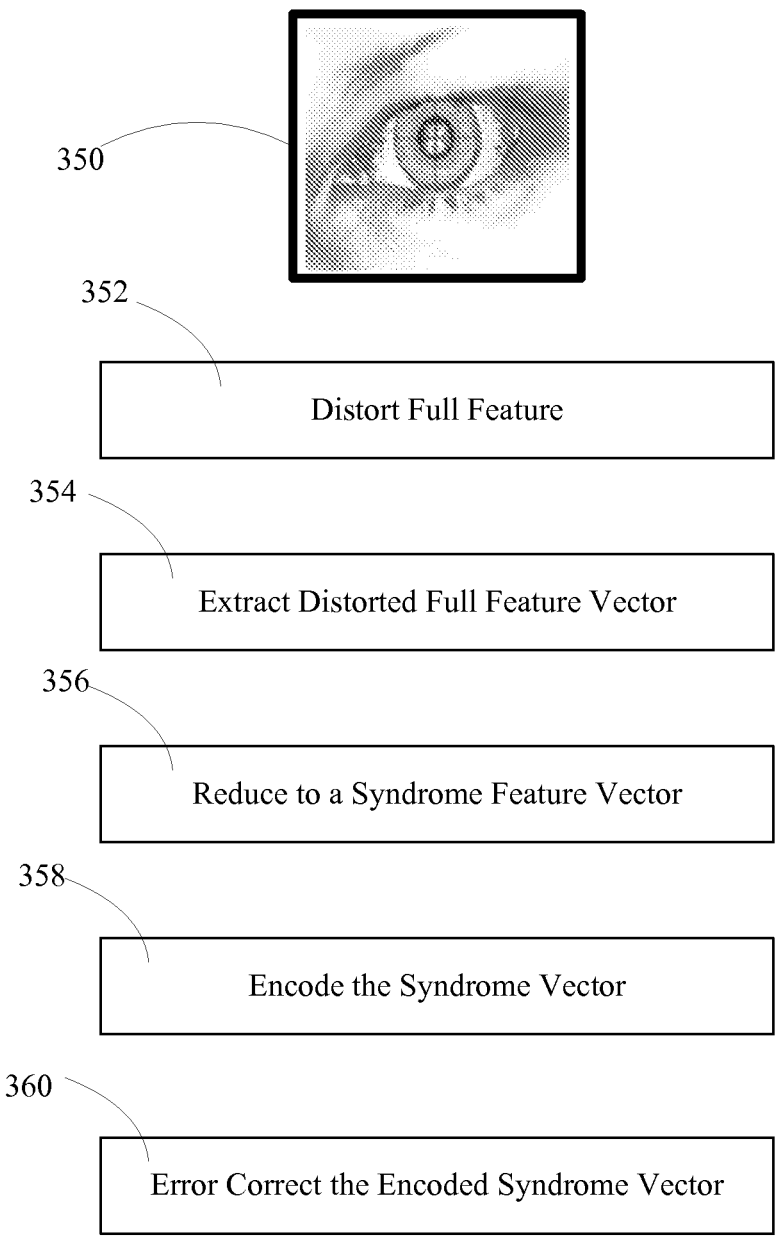
FIG. 7 is a block diagram indicating dependency relationships between biometric features, distorted biometric features, full distorted feature vectors, syndrome feature vectors and encoded syndrome vectors; according to aspects of the invention.
Figure 8:
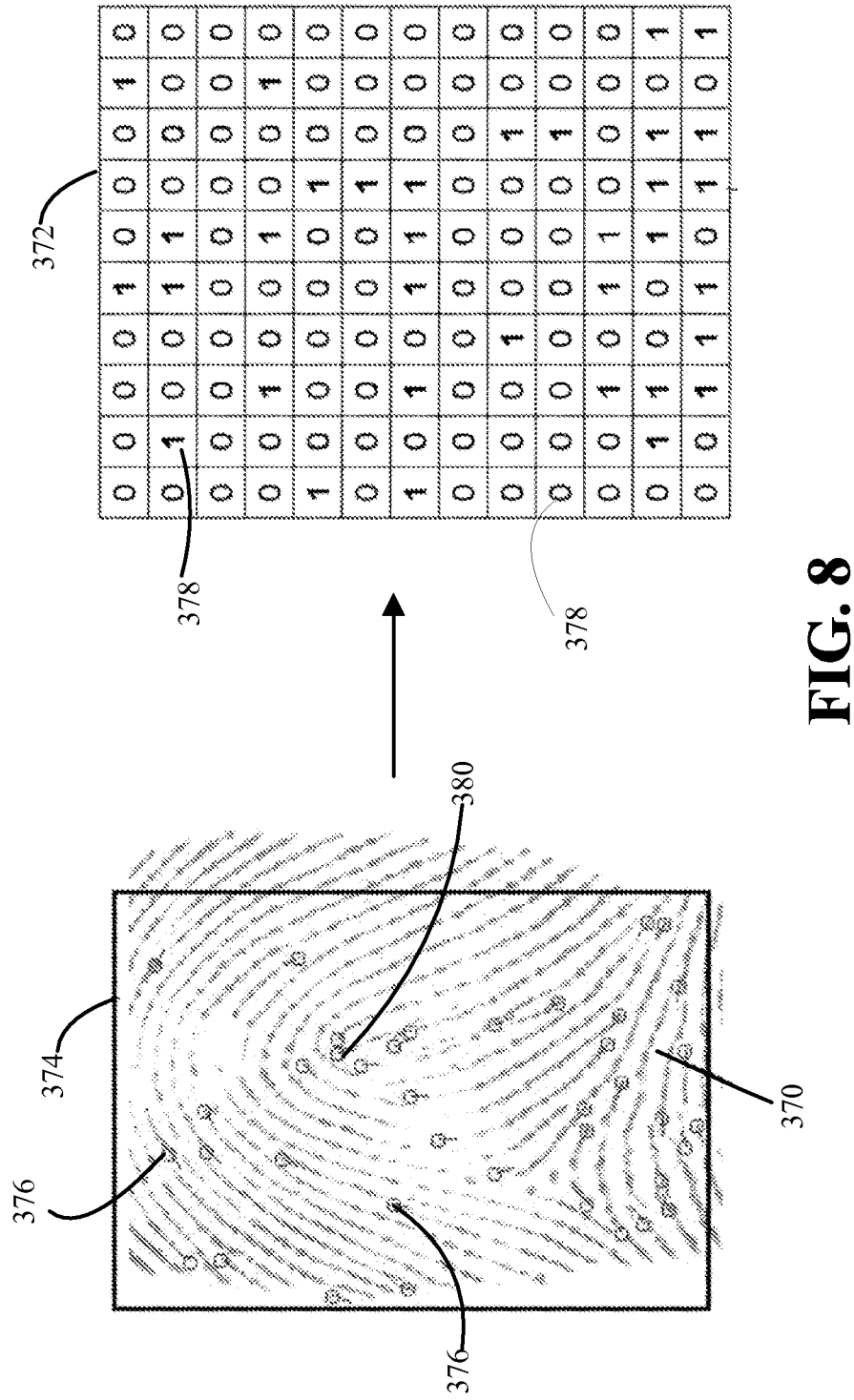
FIG. 8 is a block diagram of a fingerprint minutiae encoding according to an aspect of the invention.

At Event 206, the plurality of distorted biometric data is syndrome encoded to result in a plurality of corresponding syndrome vectors. Any known or future known syndrome code may be implemented to provide for generation of the syndrome codes. For example, Slepian Wolf (SW) code or Wyner-Ziv (WZ) code may be used as the syndrome code. Additionally, embedded syndrome codes may be implemented, which allow the syndrome encoder, during enrollment, to estimate an inherent variability of biometric data, and encode just enough syndrome bits to allow successful syndrome decoding. For a more detailed discussion of biometric syndrome vectors, see United States Patent Publication No. 2007/0174633, published Jul. 26, 2007, in the name of Draper et al., and entitled "Biometric Based User Authentication and Data Encryption". That publication is herein incorporated by reference as if set forth fully herein. FIGS. 7 and 8, which will be discussed at length, infra., provide a more detailed discussion on how syndrome vectors are formed from biometric data.

At optional Event 208, error correction is applied to at least a portion of the Syndrome Vectors to further secure the biometric data. In those aspects in which error correction is applied to the syndrome vectors, the application of error correction may be random. Thus, at Event 204, an optional randomizer, such as a random number or the like, may be applied to the error correction process. In those aspects, in which a randomizer is applied to both the distortion of the biometric data (Event 202) and the error correction process (Event 204) the randomness may be synchronized so as to implement the same randomizer, for example, the same random number.

At Event 210, the distorted biometric data in syndrome vector format, along with the private key, is communicated to another computer device. In some aspects, the communication of the distorted biometric data and the private key will occur when contact with the other computing device initially occurs. For example, based on a first time telephone call, data call or the like. The private key, which is implemented to encrypt and decrypt the data may be generated by any conventional known or future known private key generation technique.

At Event 212, based on the need to transmit encrypted data, an encryption key is generated based on a combination of the private key and a random sample of the distorted biometric data. As such, at Event 204, a randomizer, such as a random number or the like, may be applied to the selection of the distorted biometric data sample to be used in generating the encryption key. In those aspects, in which a randomizer is also applied to one or more of the distortion of the biometric data (Event 202) and the error correction process (Event 204) the randomness may be synchronized so as to implement the same randomizer, for example, the same random number. In some aspects, a one-way function may be implemented to generate the encryption key. Examples of one-way functions include, but are not limited to, Elgamel, Elliptic Curve Menezes-Qu-Vanstone (ECMQV), Elliptic Curve Diffie-Hellman (ECDH) or the like.

At Event 214, data to be transmitted is encrypted using the generated encryption key and at Event 216, the encrypted data and the randomizer are communicated to the designated computing device.

Figure 6:
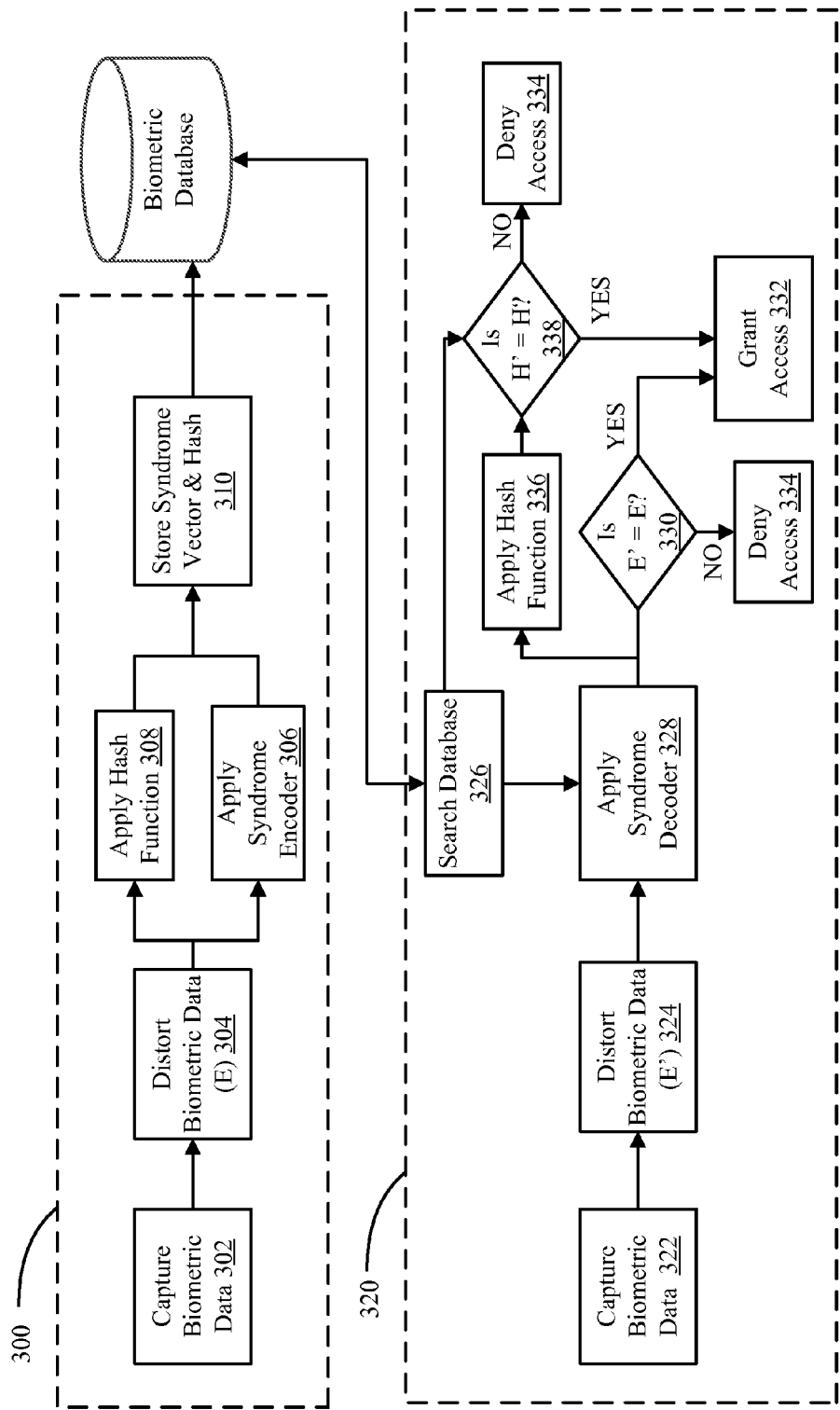
FIG. 6 is a flow diagram of a method for enrollment and authentication in an identity-based cryptosystem implementing a secure biometric model, according to yet another aspect of the invention.

FIG. 6 is a flow diagram of a method for syndrome and hashing based biometric security system for enrollment and authentication, according to a present aspect. The method compresses distorted biometric parameters with a syndrome code to produce a compressed syndrome vector. Unlike conventional compression, the original distorted biometric data cannot be reconstructed or approximated solely from the syndrome vector produced by the syndrome code. The syndrome vector and a hash of the original distorted biometric are stored in a biometric database.

In the enrollment phase 300, biometric data is captured, sensed, measured or otherwise acquired from the user, at Event 302. Thereafter, at Event 304, the biometric data is distorted, manipulated, or otherwise changed to form cancellable/distorted biometric data. At Event 306, a syndrome encoder is applied to the distorted biometric data to produce an enrollment syndrome vector. Any type of syndrome code may used to produce the syndrome vector. For example, SW code or WZ code may be used as the syndrome code. The syndrome code can be derived from so-called "repeat-accumulate codes", namely "product-accumulate codes" and codes known as "extended Hamming-accumulate codes". In one aspect of the innovation, the syndrome encoder can operate on integer-valued inputs as opposed to binary valued inputs. Additionally, the syndrome encoder may have very high compression rates to minimize storage requirements of the biometric database. Additionally, the syndrome encoder can be rate-adaptive and be configured to operate in an incremental fashion.

Optionally, at Event 308, a message authentication or hash function is applied to the distorted biometric parameters to produce an enrollment hash. The hash function can be any known or future known cryptographic hash function. At Event 310, the enrollment syndrome vector and enrollment hash pair are stored in the biometric database.

In the authentication phase 320, biometric data is again captured, sensed, measured or otherwise acquired from the user, at Event 322. Thereafter, at Event 324, the biometric data is distorted, manipulated or otherwise changed according to the same distortion, manipulation or change that occurred at the enrollment phase (Event 304), resulting in authentication distorted biometric data (E'). At Event 326, the biometric database is searched to locate the matching enrollment syndrome vector and enrollment hash. The search can check every entry in the database or a heuristically ordered search can be used to accelerate the process of finding a match. At Event 328, syndrome decoding is applied to the enrollment syndrome vector. Any syndrome decoder currently known or known in the future may be implemented. In some aspects, syndrome decoders that use belief propagation or turbo codes may be implemented, such decoders offer improved error resiliency with low complexity. At Event, 330, a direct comparison can be made between the decoded enrollment distorted biometric data (E) and the authentication distorted biometric data (E'). If the direct comparison using conventional comparison algorithms determines that the enrollment distorted biometric data is equivalent or otherwise meets a similarity threshold to the authentication distorted biometric data, at Event 332, access is granted. If the direct comparison determines that the enrollment distorted biometric data is not equivalent or otherwise does not meet a similarity threshold to the authentication distorted biometric data, at Event 334, access is denied.

Optionally, at Event 336, if a direct comparison is not implemented and/or feasible, the hash function is applied to the authentication distorted biometric data to produce an authentication hash. At Event 338, the enrollment hash stored in the biometric database is then compared to the authentication hash and if the values are determined to match or substantially match, at Event 332, access is granted. If the comparison determines that the hash values do not match at Event 334, access is denied. The optional use of the hash function in the authentication process provides for additional tolerance of variability from one measurement/capture of biometric data to a subsequent measurement/capture of biometric data.

FIG. 7 is a block diagram indicating dependency relationships between biometric data, distorted biometric data, full distorted feature vector, syndrome feature vector and encoded syndrome vector; according to an aspect of the innovation. A key parameter of any syndrome code is the number of bits in the syndrome vector. A syndrome vector with a large number of bits conveys more information about the biometric data and makes it easier to tolerate noise and variations in the biometric. Conversely, a syndrome vector with a smaller number of bits gives less information to an adversary if they gain possession on the syndrome vectors.

For example, if the length of the syndrome vector is equivalent to the length of the underlying biometric data, any amount of noise/variance could be tolerated because the original biometric data can be exactly recovered from the syndrome vector. However, an adversary that obtains the equivalent length syndrome vector can readily recover the biometric data, compromising the security of the system. In another instance, if the syndrome vector includes a small number of bits, excellent security is provided because an adversary cannot readily recover the biometric data from the syndrome vector. However, in the small bit length syndrome vector example, permissible variations between the enrollment biometric data and the authentication data are limited.

As shown in FIG. 7 raw biometric data, Block 350, is depicted as an iris scan. As previously noted, the biometric data may be any biometric data related to the user of the computing device. At Block 352, the raw biometric data is distorted to form either a plurality of distorted biometric data, each of the plurality including a segment of the full feature or, as shown in FIG. 7, a distorted full feature may result from the distortion.

At Block 354, a distorted full feature vector is extracted from the distorted biometric data and, at Block 356, the distorted full feature vector is reduced down to a syndrome feature vector. The syndrome feature vector captures those parts of the full feature vector that the security system developer determines to be appropriate for syndrome encoding and decoding. At Block 358, a syndrome code is used to encode the syndrome vector from the syndrome feature vector.

At Block 360, the encoded syndrome vector may optionally undergo error correction to further compress the data. Once the syndrome vectors are error corrected they are stored and/or transmitted to other computing devices, which rely on the syndrome encoded biometric data for decryption purposes.

FIG. 8 shows an example of fingerprint biometric data 370 and an extracted feature vector 372. The extracted feature vector 372 is an example of a syndrome feature vector (Block 356 of FIG. 7). The features of the fingerprint biometric data 370 are only measured in a measurement field, such as the area enclosed by observation window 374. The minutiae 376 are mapped to a triplet, e.g., (a, b, c) representing spatial position coordinates (a, b) and an angle (c) of the minutiae 376. One minutiae can be designated as the "core" minutiae, such as core minutiae 380, for the purpose of alignment.

Since a plane in which the fingerprint biometric data 370 is measured is quantized by a digital sensor with an array of pixels, the feature vector 372 is stored as a matrix. Each sensor pixel corresponds to a particular entry 378 in the matrix. The presence of a minutiae 376 is indicated by a "1" entry, while the lack of sensed minutiae is represented by a "0" entry in the matrix. In a more general representation, the "1" entry, signifying the presence of minutiae, may be replaced by entries indicating the angle (c) of the minutiae.

Figure 9:
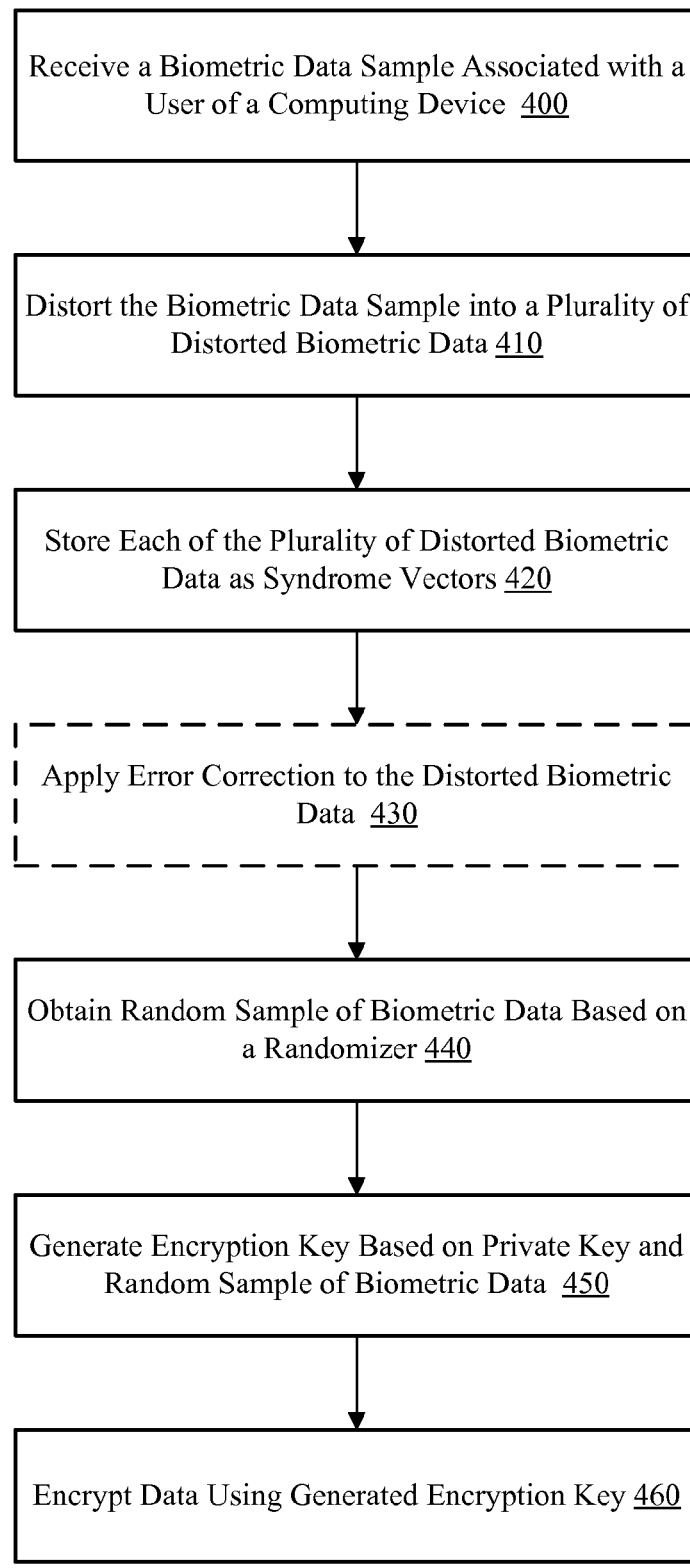
FIG. 9 is a flow diagram of a method for data encryption in an identity-based cryptosystem implementing a secure biometric model, according to an aspect of the innovation.

FIG. 9 is a flow diagram of a method for data encryption in an identity-based cryptosystem using a secure biometric model, according to present aspects. At Event 400, raw biometric data is received, sampled, captured, measured or otherwise acquired from a user of a computing device. As previous noted the biometric data may include any biometric feature or characteristic associated with a user that can be characteristically sampled. Examples of biometric data include, but are not limited to, fingerprint data, voice data, facial feature data, such as eye or iris characteristics, and the like.

At Event 410, the raw biometric data is distorted, manipulated or otherwise changed to result in a plurality of distorted biometric data, otherwise referred to as cancellable biometric data. The distortion process may be implemented in software, hardware, firmware or any combination thereof. In some aspects, distorting of the biometric data may be random distortion of the biometric data. A randomizer, such as random number or the like, may be applied to randomize the distortion process. Additionally, in some aspects, the distortion of the biometric data may dynamically change over time based on a pre-configuration of a distortion algorithm.

At Event 420, the plurality of distorted biometric data is stored as syndrome vectors in biometric database. As previously noted, any known or future known syndrome code may be implemented to provide for generation of the syndrome codes. At optional Event 430, error correction may be applied to at least a portion of the syndrome vectors to further secure the biometric data. In those aspects in which error correction is applied to the syndrome vectors, the application of error correction may be random. Thus, a randomizer, such as a random number or the like, may be applied to the error correction process. In those aspects, in which a randomizer is applied to both the distortion of the biometric data (Event 410) and the error correction process (Event 430) the randomness may be synchronized so as to implement the same randomizer, for example, the same random number.

At Event 440, a random sample of the distorted biometric is obtained from the biometric database. Thus, a randomizer, such as a random number or the like, is applied to the selection of the sample of the distorted biometric data. In those aspects, in which a randomizer is also applied to one or more of the distortion of the biometric data (Event 410) and the error correction process (Event 430) the randomness may be synchronized so as to implement the same randomizer, for example, the same random number.

At Event 450, an encryption key is generated based on a combination of the private key and the random sample of the distorted biometric data. In some aspects, a one-way function may be implemented to generate the encryption key. Examples of one-way functions include, but are not limited to, Elgamel, Elliptic Curve Menezes-Qu-Vanstone (EC-MQV), Elliptic Curve Diffie-Hellman (ECDH) or the like. At Event 460, data is encrypted using the generated encryption key.

Figure 10:
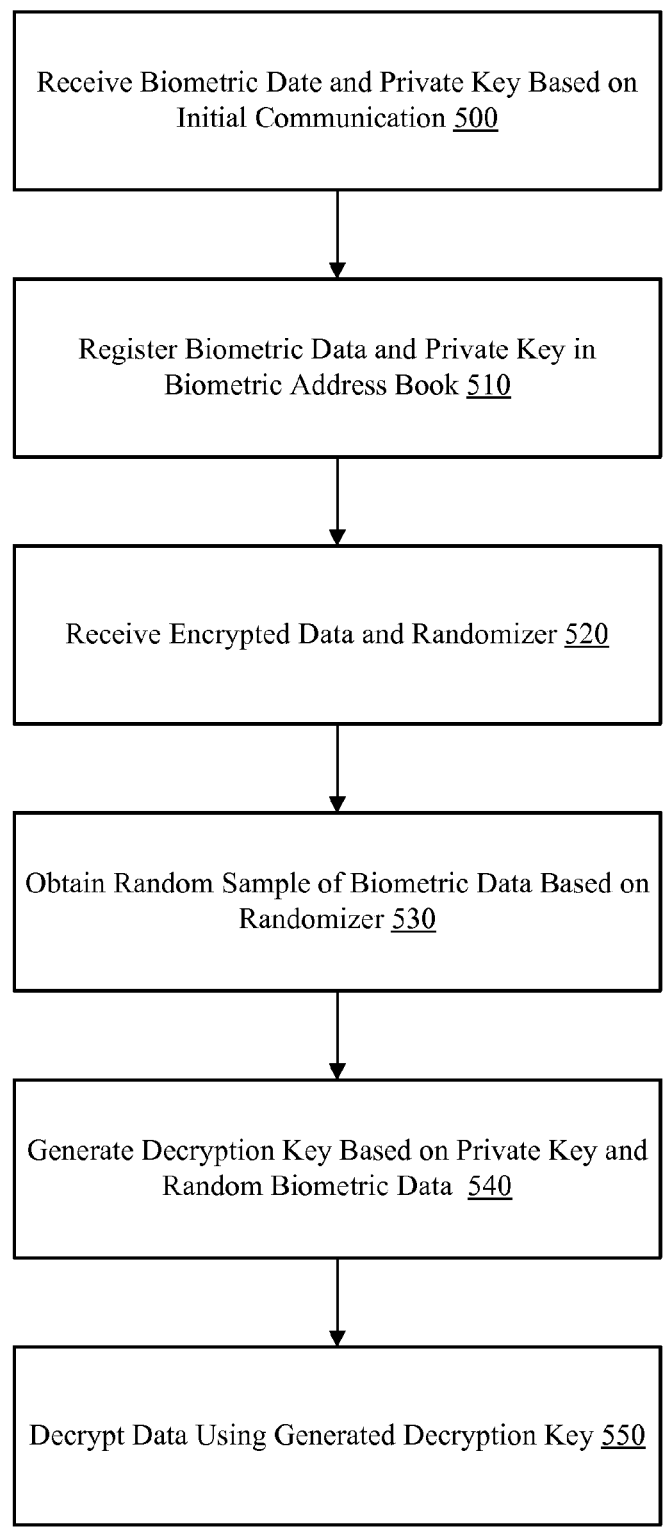
FIG. 10 is a flow diagram of a method data decryption in an identity-based cryptosystem implementing a secure biometric model, according to an aspect of the innovation.

FIG. 10 is a flow diagram of a method for data decryption in an identity-based cryptosystem using a secure biometric model, according to present aspects. At Event 500, a computing device receives biometric data and a private key from another computing device. In some aspects, the computing devices may both be wireless computing devices, while in other aspects one or more of the computing devices may be wired computing devices, such as a PC or the like. The receipt of the biometric data and associated private key may be based on an initial communication with the device that sends the biometric data. The system may be configured such that the sending device recognizes that this is a first-time communication with the receiving device, for example, based on a first time call to the telephone number, IP address or the like and, in which case, automatically communicate the biometric data and the private key. Alternatively, the system may be configured, such that the receiving/decrypting device, upon receiving a communication from the other device, verifies the existence/non-existence of a biometric data entry for the other device in the biometric address book. If an entry for the other device is not verified in the biometric address book, the receiving device requests that the other device communicates the biometric data and the private key. In some aspects, the biometric data may be distorted biometric data in the form of syndrome vectors and further, the distorted biometric data may be randomly distorted biometric data. It should also be noted that the biometric data and the private key can be received in separate communications communicated at separate points in time.

At Event 510, the biometric data and private key are registered in the biometric address book. Registering the biometric data and private key in the address book requires an association with the device that communicated the biometric data and private key. The association may be made via a device identifier, such as a telephone number, IP number or the like.

At Event 520, encrypted data and a randomizer, such as a random number or the like, is received. Receipt of the encrypted data and randomizer may coincide with the receipt of the biometric data and private key or the receipt of the encrypted data and randomizer may be at a later point in time. At Event 530, a random sample of the biometric data associated with the device that communicated the encrypted data is obtained. In this regard, the device identifier allows for retrieving the biometric data from the biometric address book and the randomizer provides for obtaining the random sample of the retrieved biometric data.

At Event 540, a decryption key is generated based on the private key and the random sample of the biometric data. In many aspects, the decryption key is generated utilizing the same one-way function implementing in encrypting the data. Thus, the one-way function may include, but are not limited to, Elgamel, Elliptic Curve Menezes-Qu-Vanstone (EC-MQV), Elliptic Curve Diffie-Hellman (ECDH) or the like. At Event 550, the data is decrypted using the generated decryption key.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

This, present aspects herein describe methods, apparatus, and computer program products that provide for an identity-based cryptosystem using a highly secure biometric model through which both access and data transmission are effectively made secure. Through implementation of generating and securely storing biometric data as syndrome vectors tolerance is provided for the inherent variability of biometric data. In addition, to insure that the biometric data is not duplicated by adversaries who might gain access to the syndrome generation algorithm and the biometric data, present aspects, provide for keeping the private key more secure and making the cryptosystem user-identity dependent. As such the systems, apparatus and computer program products herein disclosed provide end-to-end authentication of end users using secure biometry, which constitute the symmetric and/or asymmetric identity-based cryptosystem.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for encrypting a data transmission using randomized biometric data, comprising:
receiving a biometric data sample associated with a user of a computing device;
distorting at the computing device the biometric data sample into a plurality of distorted biometric data;
storing at the computing device the plurality of distorted biometric data as a plurality of syndrome vectors;
obtaining at the computing device a random sample of syndrome vectors selected from the stored plurality of syndrome vectors corresponding to the plurality of distorted biometric data;
generating at the computing device an encryption key using a combination of a private key associated with the device and the random sample of the syndrome vectors selected from the stored plurality of syndrome vectors corresponding to the plurality of distorted biometric data;
encrypting at the computing device a data transmission using the encryption key; and
communicating to a second computing device the encrypted data transmission with a randomizer value, the randomizer value used to select from registered biometric data, initially received from the computing device and stored at the second computing device during an initial registration operation, a syndrome vectors sample that is same as the random sample of syndrome vectors obtained at the computing device to generate at the second computing device a decryption key based on the private key and the syndrome vectors sample selected at the second computing device.

2. The method of claim 1, further comprising communicating the stored plurality of syndrome vectors corresponding to the plurality of distorted biometric data and the private key to the second computing device upon establishing a first communication with the second computing device.

3. The method of claim 1, wherein distorting the biometric data sample further comprises randomly distorting the biometric data sample into the plurality of distorted biometric data.

4. The method of claim 3, wherein randomly distorting the biometric data sample into the plurality of distorted biometric data and obtaining the random sample of the stored distorted biometric data are performed as synchronized randomization.

5. The method of claim 1, wherein distorting the biometric data sample further comprises dynamically distorting the biometric data sample into the plurality of distorted biometric data.

6. The method of claim 1, further comprising applying error correction to one or more of the plurality of distorted biometric data.

7. The method of claim 6, wherein applying error correction further comprises randomly applying error correction to one or more of the plurality of distorted biometric data.

8. The method of claim 7, wherein distorting the biometric data, applying error correction and generating the encryption key are further performed in synchronized randomization.

9. The method of claim 1, wherein generating the encryption key further comprises generating the encryption key using a one-way function.

10. The method of claim 1, wherein distorting the biometric data sample further comprises randomly distorting the biometric data sample into the plurality of distorted biometric data using a generated random number;
and wherein the method further comprises randomly applying error correction to at least a portion of the plurality of distorted biometric data using the same generated random number used for distorting the biometric data sample such that the randomness used for randomly distorting the biometric data sample and randomly applying error correction to the at least the portion of the plurality of the distorted biometric data is synchronized.

11. At least one processor configured to encrypt data transmissions using randomized biometric data, comprising:
a first module for receiving a biometric data sample associated with a user of a computing device;
a second module for distorting at the computing device the biometric data sample into a plurality of distorted biometric data;
a third module for storing at the computing device the plurality of distorted biometric data as a plurality of syndrome vectors;
a fourth module for obtaining at the computing device a random sample of syndrome vectors selected from the stored plurality of syndrome vectors corresponding to the plurality of distorted biometric data;
a fifth module for generating at the computing device an encryption key using a combination of a private key associated with the device and the random sample of the syndrome vectors selected from the stored plurality of syndrome vectors corresponding to the plurality of distorted biometric data;
a sixth module for encrypting at the computing device a data transmission using the encryption key; and
a seventh module for communicating to a second computing device the encrypted data transmission with a randomizer value, the randomizer value used to select from registered biometric data, initially received from the computing device and stored at the second computing device during an initial registration operation, a syndrome vectors sample that is same as the random sample of syndrome vectors obtained at the computing device to generate at the second computing device a decryption key based on the private key and the syndrome vectors sample selected at the second computing device.

12. A computer program product, comprising:
a non-transitory computer-readable medium comprising:
a first set of codes for causing a computer to receive a biometric data sample associated with a user of a computing device;
a second set of codes for causing the computer to distort the biometric data sample into a plurality of distorted biometric data;
a third set of codes for causing the computer to store at the computing device the plurality of distorted biometric data as a plurality of syndrome vectors;
a fourth set of codes for causing the computer to obtain at the computing device a random sample of syndrome vectors selected from the stored plurality of syndrome vectors corresponding to the plurality of distorted biometric data;
a fifth set of codes for causing the computer to generate at the computing device an encryption key using a combination of a private key associated with the device and the random sample of the syndrome vectors selected from the stored plurality of syndrome vectors corresponding to the plurality of distorted biometric data;
a sixth set of codes for causing the computer to encrypt a data transmission using the encryption key; and
a seventh set of codes for causing the computer to communicate to a second computing device the encrypted data transmission with a randomizer value, the randomizer value used to select from registered biometric data, initially received from the computing device and stored at the second computing device during an initial registration operation, a syndrome vectors sample that is same as the random sample of syndrome vectors obtained at the computing device to generate at the second computing device a decryption key based on the private key and the syndrome vectors sample selected at the second computing device.

13. An apparatus, comprising:
means for receiving a biometric data sample associated with a user of a computing device;
means for distorting at the computing device the biometric data sample into a plurality of distorted biometric data;
means for storing at the computing device the plurality of distorted biometric data as a plurality of syndrome vectors;
means for obtaining at the computing device a random sample of syndrome vectors selected from the stored plurality of syndrome vectors corresponding to the plurality of distorted biometric data;
means for generating at the computing device an encryption key using a combination of a private key associated with the device and the random sample of the syndrome vectors selected from the stored plurality of syndrome vectors corresponding to the plurality of distorted biometric data;
means for encrypting at the computing device a data transmission using the encryption key; and
means for communicating to a second computing device the encrypted data transmission with a randomizer value, the randomizer value used to select from registered biometric data, initially received from the computing device and stored at the second computing device during an initial registration operation, a syndrome vectors sample that is same as the random sample of syndrome vectors obtained at the computing device to generate at the second computing device a decryption key based on the private key and the syndrome vectors sample selected at the second computing device.

14. An apparatus, comprising:

a computing platform including a processor and a memory in communication with the processor;

one or more biometric sensors in communication with the processor;

a biometric data distorter in communication with the processor and the biometric sensors and operable to distort biometric data captured by the sensors into a plurality of distorted biometric data;

a biometric sampler in communication with the processor, the memory and the biometric data distorter, wherein the biometric sampler is operable to generate and store syndrome vectors for each of the plurality of distorted biometric data;

an encryption key generator in communication with the processor and the biometric sampler operable to obtain a random sample of syndrome vectors selected from the stored syndrome vectors corresponding to the plurality of distorted biometric data and generate an encryption key based on the random sample of the syndrome vectors selected from the stored syndrome vectors corresponding to the plurality of distorted biometric data and a private key;

a randomization module in communication with the processor and the encryption key generator, wherein the randomization module is operable to apply a randomizer to randomly obtain the random sample of the syndrome vectors selected from the stored syndrome vectors corresponding to the plurality of distorted biometric data;

an encryption engine operable to encrypt data transmissions using the encryption key; and a communications module operable to communicate to a second computing device the encrypted data transmission with a randomizer value, the randomizer value used to select from registered biometric data, initially received from the apparatus and stored at the second computing device during an initial registration operation, a syndrome vectors sample that is same as the random sample of syndrome vectors obtained at the apparatus to generate at the second computing device a decryption key based on the private key and the syndrome vectors sample selected at the second computing device.

15. The apparatus of claim 14, wherein the communications module is operable to communicate error corrected, distorted biometric data to the second computing device upon establishing a first-time communication with the second computing device.

16. The apparatus of claim 14, wherein the randomization module is in further communication with the biometric data distorter, wherein the randomization module is further operable to apply a randomizer to the biometric data distorter to randomly distort the biometric data sample into the plurality of distorted biometric data.

17. The apparatus of claim 14, wherein the biometric data distorter is further operable to dynamically change distortion of the biometric data.

18. The apparatus of claim 14, further comprising an error correction module operable for applying error correction to one or more of the plurality of distorted biometric data.

19. The apparatus of claim 18, wherein the randomization module is in further communication with error correction module, wherein the randomization module is further operable to provide a randomizer to the error correction module to randomly apply error correction to one or more of the plurality of distorted biometric data.

20. The apparatus of claim 18, wherein the randomization module is in further communication with the error correction module and the biometric data distorter, wherein the randomization module is further operable to provide a synchronized randomizer to the encryption key generator to randomly obtain the sample of stored syndrome vectors corresponding to the plurality of distorted biometric data, to the error correction module to randomly apply error correction to one or more of the plurality of distorted biometric data, and to the biometric data distorter to randomly distort the biometric data sample into the plurality of distorted biometric data.

21. The apparatus of claim 18, wherein the communications module is operable to communicate the synchronized randomizer and the encrypted data to other computing devices in possession of the distorted biometric data.

22. The apparatus of claim 14, wherein the encryption key generator is further operable to generate the encryption key using a one-way function.

\* \* \* \* \*